US008032760B2

(12) United States Patent
Tuyls et al.

(10) Patent No.: US 8,032,760 B2
(45) Date of Patent: Oct. 4, 2011

(54) METHOD AND SYSTEM FOR AUTHENTICATION OF A PHYSICAL OBJECT

(75) Inventors: Pim Theo Tuyls, Eindhoven (NL); Theodorus Jacobus Johannes Denteneer, Eindhoven (NL); Johan Paul Marie Gerard Linnartz, Eindhoven (NL); Evgeny Alexandrovitch Verbitskiy, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 904 days.

(21) Appl. No.: 10/557,628

(22) PCT Filed: May 13, 2004

(86) PCT No.: PCT/IB2004/050689
§ 371 (c)(1),
(2), (4) Date: Nov. 17, 2005

(87) PCT Pub. No.: WO2004/104899
PCT Pub. Date: Dec. 2, 2004

(65) Prior Publication Data
US 2007/0044139 A1    Feb. 22, 2007

(30) Foreign Application Priority Data

May 21, 2003    (EP) .................................... 03101453

(51) Int. Cl.
*G06F 21/00*    (2006.01)
(52) U.S. Cl. ..................... 713/186; 726/2; 726/3; 726/4

(58) Field of Classification Search .................. 380/277, 380/44; 726/2, 9, 20; 369/24.01; 711/100; 713/168–170, 172, 186; 382/125
See application file for complete search history.

(56) References Cited

U.S. PATENT DOCUMENTS
3,824,951 A * 7/1974 Le Vantine et al. .......... 118/31.5
(Continued)

FOREIGN PATENT DOCUMENTS
EP    0996257 A2    4/2000
(Continued)

OTHER PUBLICATIONS
Vizcaya, Pedro R., Ph.D., A personnel identity verification method using dab fingerprints, Rensselaer Polytechnic Institute, 1998, Source type: Dissertation, Publication Number: AAT 9903711, ISBN: 97805990096610.*

(Continued)

*Primary Examiner* — Eleni Shiferaw
*Assistant Examiner* — Jing Sims (57) ABSTRACT

A system for authenticating a physical object includes an enrolment device, an authentication device, and a storage for storing authentication data. The enrolment device includes an input for receiving a property set Y of the object measured using a measurement procedure. A processor is used for creating a property set I from the measured property set Y that meet a predetermined robustness criterion. It then creating a property set A from the property set I that includes less information on the actual properties than property set Y, and finally generates a control value V in dependence on properties of the property set A. An output is used for supplying the control value to the storage as part of the authentication data. The enrolment device operates in an analogous way.

20 Claims, 2 Drawing Sheets

U.S. PATENT DOCUMENTS

| | | | | |
|---|---|---|---|---|
| 3,947,876 A | * | 3/1976 | Gray | 360/40 |
| 5,799,098 A | * | 8/1998 | Ort et al. | 382/125 |
| 6,035,398 A | * | 3/2000 | Bjorn | 713/186 |
| 6,314,196 B1 | * | 11/2001 | Yamaguchi et al. | 382/125 |
| 7,093,131 B1 | * | 8/2006 | Kobayashi | 713/176 |
| 2002/0196963 A1 | * | 12/2002 | Bardwell | 382/124 |
| 2003/0191764 A1 | * | 10/2003 | Richards | 707/100 |
| 2004/0125993 A1 | * | 7/2004 | Zhao et al. | 382/124 |

FOREIGN PATENT DOCUMENTS

| | | |
|---|---|---|
| GB | 2171880 A | 9/1986 |
| JP | 6290154 A | 10/1994 |

OTHER PUBLICATIONS

Peetz, "HiperLAN/2 Multihop Ad Hoc Communication by Multiple-Frequency Forwarding" Vehicular Technology Conference, Rhodes, May 2001.

Habetha et al, "Concept of a Wireless Centralised Multihop Ad Hoc Network", Proceedings European Wireless, Dresden, Sep. 2000.

Habetha et al, "Central Controller Handover Procedure for ETSI_BRAN HiperLAN/2 Ad Hoc Networks and Clustering with Quality of Service Guarantees", 1st IEEE Annual Workshop on Mobile Ad Hoc Networking & Computing, Aug. 11, 2000.

Jiandong et al, "User-dependent Perfect-scheduling Multiple Access", Proceedings of 16th International Conference on Communication Technology, vol. 2, Aug. 2000, pp. 1714-1717.

* cited by examiner

METHOD AND SYSTEM FOR AUTHENTICATION OF A PHYSICAL OBJECT

The invention relates to a method of generating authentication data for a physical object, and a method of authenticating a physical object. The invention further relates to an authentication system.

Authentication of physical objects can be used for many applications, such as conditional access to secure buildings or conditional access to digital data (e.g. stored in a computer or removable storage media), or for identification purposes (e.g. used for charging the identified person for a particular activity). Biometrical authentication is well-known. In such systems, biometrical properties of a human (the physical object) are read using a suitable reader, such as a fingerprint scanner or iris scanner. The properties are compared to reference data. If a match occurs the human is identified or can be granted access. The reference data for the user has been obtained earlier in an enrollment phase and is stored securely, e.g. in a secure database or smart-card.

The physical object to be authenticated may also be non-human. For example, the object may be a storage medium like a CD, DVD, solid-state memory containing protected digital content. The content itself may be stored in an encrypted form as a measure against unauthorized rendering and/or copying. An authentic storage medium typically includes measurable properties that enable a rendering/copying apparatus to obtain the necessary decryption key, preferably in such a way that unauthorized playback apparatuses cannot obtain these keys. Typically the properties are not stored as regular data, since this would make it possible to make an illegal one-to-one copy of the protected content and the properties. Such a copy could then not be distinguished from the original and would be seen as authentic. Instead, the properties are at least partly hidden in the medium itself, rather than by storing it as data on the storage medium. The properties are obtained from the storage medium as variations in a physical parameter of the storage medium. For optical discs, one way of doing this is through the use of a so-called "wobble". Different media will have a different wobble or no wobble at all, so the outcome of the authentication will not yield the decryption key that is required for decrypting the content. Reference is made to U.S. Pat. No. 5,724,327 to the same assignee as the present invention which describes various techniques to create such a "wobble" and to store information in it. The wobble is an example of a Physical Uncloneable Function (PUF).

Typically, the authentication protocols convert the properties cryptographically into a protected control value. The generated control value is compared to a stored reference control value. The reference data is, for example, stored at a central server at work, in a bank, or in a nightclub where only members have access, or at many other locations where a user has conditional access or needs to be identified. As biometrics are unique identifiers of human beings, privacy problems may arise. People feel uncomfortable with supplying their biometrical information to a large number of seemingly secure databases. Practice has shown that the biometrical information may become available through an insecure implementation (e.g. broken by a hacker) or through misuse by an operator of the system. In particular during the enrollment, the unprotected biometrical data is available. If the information is available at many locations, the chance of misuse increases. It should also be recalled that biometrical data is a good representation of the identity of the user. 'Stealing' some or most of the biometrical data of a person (possibly by breaking only one implementation) can be seen as an electronic equivalent of stealing the person's identity. The stolen data may make it relatively easy to gain access to many other systems protected by biometrical data. Thus, the "identity theft" using the biometric information can have much more serious implications than the "simple" theft of a credit card. Whereas it is relatively easy to revoke a credit card, it is much more complicated to revoke one's biometrical identity. A further problem of using some biometric information (in particular retina scan) is that it can reveal illness patterns and is therefore very vulnerable to misuse. Some of these problems are also pertinent to authentication of physical objects other than based on biometrical data. For example, a person may have an identity card that can be automatically verified by reading properties of the card. If the card is successful and is used for many applications, revocation of the card becomes cumbersome.

Many authentication protocols use a one-way function, such as a hash, that reduces the amount of data that needs to be stored in the reference control value. The conventional one-way functions are very sensitive to small perturbations in their inputs. Therefore, those cryptographic primitives can not be applied straightforwardly when the input data is noisy. This is typically the case when the input data is obtained from the measurement of physical objects such as biometrics, PUFs, etc.

WO 02/078249 describes an authentication method that operates directly on the measured properties, i.e. with vectors in an n-dimensional Euclidian space. Unspecified features, say $X_1, \ldots, X_s \in R$, are extracted and the means $\mu_i$ and the variances $\sigma_i^2$ of each feature $X_i$, $i=1, \ldots, s$ are estimated. Further, a real number $r \in (0,1)$ is selected and the codebook $B=\{(w_1, \ldots, w_s): w_i=r\sigma_i k_i, i=1, \ldots, s; k_i \in Z\}$ is formed. At the next step, a random vector $\delta=(\delta_1, \ldots, \delta_s)$ is selected, so that $c=(c_1, \ldots, c_s)$, with $c_i=\mu_1-\delta_1$, is a valid code word from the code B. Finally, h(c)—the hashed version of c, and $\delta$ are stored. Authentication consists of selection of a codeword c': $c'=\mathrm{argmin}_{c \in B}\|x'-\delta-\|$, and comparing the hashed version of c':h(c'), with the stored value of h(c). In other words, the input feature $X_1$ is shifted by a random number $\delta_i$, and the value is quantized to the nearest point from a lattice with step size $r\sigma_i$. In this approach, the offset $\delta$ and the hashed version of the code word $c_0$ are publicly available (or, they become available if the database is compromised). One may assume that the attacker is in principle able to invert the hash function, and obtain the code word $c_0$, hence giving the attacker access to the identity $x_0$. Moreover, this scheme is unreliable. The probability of authenticating correctly an s-dimensional feature vector measured on an honest user is less than $2^{-s}$, which is too low for practical purposes.

It is an object of the invention to provide an improved method and system for authentication based on properties of a physical object.

To meet the object of the invention, a method of generating authentication data for authenticating a physical object includes:

measuring a property set Y of the object using a measurement procedure;

creating a property set I from the measured property set Y that meet a predetermined robustness criterion;

creating a property set A from the property set I that includes less information on the actual properties than property set Y;

generating a control value V in dependence on properties of the property set A and inserting the control value in the authentication data.

The method according to the invention, acts directly on the measured properties without mapping the properties to codebook values. The measured properties must be quantized into discrete values before they can be processed cryptographically. As measurement properties contain noise, the outcome of the quantization may differ from experiment to experiment. In particular if a physical parameter takes on a value close to a quantization threshold, minor amounts of noise can change the outcome. After applying a cryptographic function to the quantized data, minor changes will be magnified and the outcome will bear no resemblance to the expected outcome. This is fundamentally a necessary property of cryptographic functions. To reduce the risk of acting on unreliable properties, first a set of robust properties is created from the measured set. The robust set may include properties with a high signal to noise ratio. The amount of information in the robust property set is then reduced. The reduced property set forms the basis of the control value used for the authentication. Breaking the control value would only reveal the reduced set of information. The robust property set will still include information not yet revealed. This unrevealed information can be used for other authentication applications, even if these application are also based on data that has already been revealed.

According to the measure of the dependent claim 2, a contracting transformation is performed. The contracting transformation converts predetermined input values to corresponding output values. It also converts arbitrary input values that sufficiently resemble one of the predetermined input values to the same corresponding output value. On the other hand, substantially different input values are converted to different output values. An example of such a contracting transformation is a delta-contracting function that has a primary input (the cryptographic data), a secondary input (the helper data) and generates output based on the primary and secondary inputs. The secondary input is a control input that defines ranges of values (e.g. within a predetermined distance of a target input value using a predetermined distance measure) for the primary input signal and the corresponding output value for each range of primary input values. The contracting transformation increases the robustness further, since a property of the physical object is always converted to the same output value as long as the property is only affected by a limited amount of noise so that it still falls within the same input value range. Moreover, it reduces the information. From the output it is not directly possible to conclude what the input was.

As described in the measure of the dependent claim 3, the contracting transformation transforms a property with more than two possible values (typically at least eight bit values) to a binary number representative of a sign of the property. The sign can either be positive or negative. A positive value may be represented as a digital '0' and the negative value as a digital '1' or vice versa. Zero-valued properties should normally not occur in the robust set.

As described in the measure of the dependent claim 4, the step of creating the property set A includes selecting a subset of the property set I. Selecting a subset is also an effective way of reducing the amount of information. As described in the measure of the dependent claim 5, the subset selection is preferably steered by helper data W. For example, the helper data may specify which properties to use and which not to use. The helper data W is inserted in the authentication data using during the actual authentication. Preferably, the helper data W is unique for an authentication application. By using a different selection process for each application, breaking of the subset used for one application leaves the other applications unaffected (at least for as long as a sufficient amount of data is not yet revealed).

As described in the measure of the dependent claim 7, the creation of robust properties uses a predetermined robustness criterion based on a signal to noise ratio of the measured properties. The step of creating the property set I includes performing a transformation $\Gamma$ on the property set Y to create disjunct property sets $I_1$ and $I_2$ where a signal to noise ratio of properties of $I_1$ are estimated to be higher than a signal to noise ratio of properties of $I_2$; and using $I_1$ as the property set I. The criterion may be based on statistical properties of the measurement procedure so that statistically reliable properties can be extracted. The criterion may also be adapted until the property set $I_1$ includes the desired number of properties.

Preferably, the transformation $\Gamma$ is a linear transformation that converts a vector representing the property set Y to a vector with components $\alpha_i$ representing the set I, where each vector component $\alpha_i$ is independent of the other vector components $\alpha_j (j \neq i)$ and wherein the vector components are sorted according to an estimated signal to noise ratio. This is an effective way of obtaining the desired number of independent robust properties. Suitable transformations may be based on principal component analysis or Fisher's discriminant transformation.

As described in the measure of the dependent claim 10, the statistical property that may be used for the transformation includes a covariance matrix derived from estimated properties X of the object and a corresponding statistical distribution F.

As described in the measure of the dependent claim 11, created properties with an absolute value larger than the threshold are used for the set $I_1$; the others being not used any further. The threshold is derived from a noise level in the measured property set.

As described in the measure of the dependent claim 12, now that a robust and reduced set of properties has been created the control value V is created by performing a cryptographic function on the properties. By not revealing the properties itself but only a cryptographic representation of it, detection of the information is more difficult. The cryptographic function is preferably a one-way function, such as a one-way hash.

These and other aspects of the invention are apparent from and will be elucidated with reference to the embodiments described hereinafter.

Figure 1:
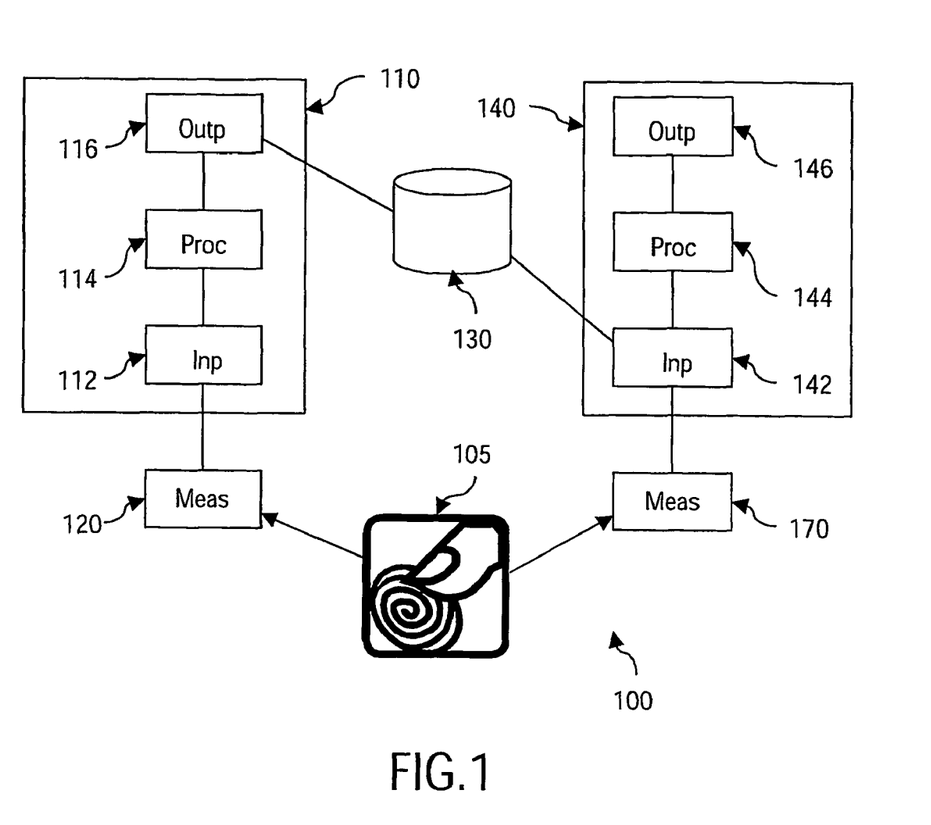
FIG. 1 shows a block diagram of the authentication system according to the invention.

FIG. 1 shows a block diagram of the system 100 according to the invention. The system includes an enrollment device 110 that generates authentication data and stores it in a storage 130. To this end, the enrollment device includes an input 112 for receiving properties measured from a physical object 105. The properties are measured using a suitable measuring device 120 that may be incorporated into the enrollment device. The physical object may be a human. Shown is that a fingerprint 105 is measured from a human. Also other biometrical data may be measured, such as scanning an iris. These techniques are in itself known and will not be described any further. The object may also be non-human. For example, the object may be an electronic identification card. In particular, the object may be a data carrier, such as a carrier of digital audio/video content (e.g. CD). In such a case the object 105 may be combined with the storage 130, i.e. the object also carries the authentication data. If the object is a storage medium object, the properties may be variations in a physical parameter of the storage medium. Those variations may have been made intentionally, specific for each object, or may be random. As long as the variations are sufficiently unique for the object they can be used for the authentication. Irrespective of the physical object, it is assumed that for the physical object plurality of properties are measured. In principle, the properties are 'analogue', each quantized to a multi-bit value. Typically, at least 8-bit property values will be used. The enrollment device includes a processor 114 for generating the authentication data. The processor may be any suitable processor, such as for example used in a personal computer. Typically, a general purpose processor is used operated under control of a suitable program. The program may be stored in a non-volatile memory. Since the enrollment device creates authentication data that preferably can not easily be broken it is preferred to take some security steps. For example, the enrollment device may be placed in a secure environment or parts of the processing steps may be executed in a secure module, such as a tamper proof cryptographic module. The authentication data is stored in the storage 130 via output 116.

The system further includes at least one authentication device 140. The authentication may in principle be done using the same apparatus as used for the enrollment. In such a case, the enrollment device and authentication device are the same. In the description it will be assumed that both devices are separate to clarify the differences between enrollment and authentication. The enrollment device includes an input 142 for receiving properties measured from the physical object 105. The properties are measured using a suitable measuring device 170 that may be incorporated into the authentication device. Preferably, the measurement devices 120 and 170 are of a similar design. The same physical object is measured as for which the authentication data has been created by the authentication device 110. The authentication device includes a processor 144 for comparing the object properties against the authentication data. The processor may be any suitable processor, such as for example used in a personal computer. Typically, a general purpose processor is used operated under control of a suitable program. The program may be stored in a non-volatile memory. The input of the authentication device is also used for receiving the authentication data from the storage 130. It will be appreciated that the enrollment device, storage, and authentication device may be physically far removed. If so, suitable communication means may be used for exchanging the authentication data. The storage 130 may also be incorporated into the enrollment device.

In the description, the term authentication is used in a broad meaning. The described technique can be used for verifying that the physical object is authentic, i.e. genuine, but can also be used for establishing an identity of the object, or any other suitable person. The outcome of the described method and system is a control value. This control value can be used for any purpose. For example, if during authentication a match occurs this may trigger an action, like giving a person entrance to a building or a computer. Equally well, data that has been stored in correspondence with the control value may be loaded. This may, for example, be any form of identification, like the name of the person, but this may equally well be an identification number. Even a bank account number may be retrieved, giving the authenticated person access to the account. AU such variations fall within the skills of a skilled person and will not be described in more detail here. The description will focus on authentication (including identification) of a human using biometrics. It will be appreciated that the same technique can be used for many other purposes as well, that have in common the authentication of properties measured from a physical object.

The protocol for the authentication of physical objects according to the invention is designed to satisfy the following three requirements:

(i) Robustness to Noise

Intrinsically, the measurements will be corrupted by noise since it involves biometrics or physical measurements. The authentication scheme is designed to be robust to small noise, i.e., if the system is presented with the measurement $X+\epsilon$, where X is the "true" template, and $\epsilon$ is the measurement noise, the system should be able to answer positively to the request whether the measurement $X+\epsilon$ belongs to the person or the object, which it claims it is. This requirement will be referred to by the term noise-contracting.

(ii) Security

There are various security considerations in the development of the authentication protocol. Firstly, it should be sufficiently difficult for the attacker to impersonate another person without access to a template. Secondly, the attacker should not be able to deduce any information about the template or the secret from the information he gets from the server. In the remainder, the authentication scheme is said to be 0-revealing, if the attacker cannot extract any information about the secret from the information he receives, and said to be E-revealing, if the information the attacker gets, is negligible compared to the information he has to guess. Thirdly, one has to consider protection against "eaves-dropping", i.e., the possibility that the communication channel which carries the coded secret might be observed by an attacker. This third security threat can be eliminated by standard methods like Zero-Knowledge protocol and will not be described here in much detail.

(iii) Privacy.

By privacy is meant, that even in the case the secure database storing the control value is compromised, and the secret of 'Alice' (the person's whose identity is stored in the representation of a control value) becomes known to the attacker, the attacker would in principle be able to authenticate himself as Alice in this particular application, but he would not be able to authenticate himself as Alice in any other application, which relies on the same biometric template. In other words, by breaking into this database, the attacker will learn a particular secret generated for Alice using her biometric template, but he would not learn the template itself. Hence, he would not be able to produce other secrets which are generated using Alice's template. But more importantly, sensitive information which can be deduced from a template, like the presence of certain diseases from the retina-scan, is not revealed.

Enrollment Performed by the Enrollment Device:

During this phase the person or physical object has to visit the enrollment device, e.g. located at a Certification Authority (CA). The properties of the object/person are measured, processed and stored as reference data V for later use together with any helper data W that may have been used to steer the processing. Preferably, the helper data is determined by the properties of X. In an on-line application, these data can be stored in a central database or these data can be certified by a digital signature of the CA and be given to the service provider.

In short, the enrollment device according the invention performs the following steps:

(1) Get measurements, giving a property set Y
(2) Create robust properties from the property set Y, giving a set of robust properties I (3) Reduce the information in property set I, giving a property set A
(4) Generate a control value V based on property set A
(5) Store V and any helper data W that may have been used to steer the processing As will be described below, steps 2 and 3 can be seen as a signal processing function G operating on the property set Y, under control of the helper data W, giving as output G(Y,W). This forms the property set A. The signal processing may show steps 2 and 3 as separate sequential processing steps (illustrated below in two embodiments) but can also be performed in one integrated processing step (shown below for one embodiment). The helper data W may steer both steps 2 and 3. For authentication, typically steps 2 and 3 can be performed in one operation, since W is already known.

The control value V may simply be the property set A. In order to protect the communication line between the enrollment device, storage, and authentication device, in a preferred embodiment, creating the control value V includes performing a cryptographic function on properties of the property set A. Preferably, the cryptographic function is a homomorphic one-way function. A suitable hash is the function. $r \mapsto r^2$ mod $n, m \mapsto g^{m+nr}$ mon $n^2$ for a randomly chosen $r \in Z_n$ and g being the generator of a subgroup (Paillier encryption function). The encrypted secret derived from the biometric measurements are then stored at the database. These homomorphic one-way functions allow to set-up a Zero-Knowledge protocol for checking the knowledge of the template without revealing any information. As the communication during Zero-Knowledge protocols preferably changes every session, the communication line is better protected.

Authentication Performed by the Authentication Device

This authentication protocol consists of a measurement apparatus that extracts analog measurement data Y from a physical object. These analog data are then processed through a signal processing function G(Y,W), making use of the auxiliary data W, and finally protected by applying a collision resistant one-way hash function h to it. It is important to choose the function G appropriately. More precisely the protocol performs the following steps.

(1) Get V and any helper data W that may have been used to steer the processing
(2) Get measurements, giving a property set Y
(3) Create robust properties from the property set Y, giving a set of robust properties I
(4) Reduce the information in property set I, giving a property set A
(5) Generate a control value V' based on property set A
(6) Compare V' against V: if there is a match, the object has been authenticated Note: the helper data (if any) is used in an analogous way to steer the processing as done during the enrollment. For authentication, typically steps 2 and 3 can be performed in one operation, since it is already known from the enrollment which properties are robust (described by helper data W), so in many embodiments it will be possible to perform step 4 on only selected properties without explicitly creating the smaller set.

Measurements

A suitable measurement procedure is used to obtain a property set Y of the physical object to be authenticated (or enrolled), represented as an n-dimensional vector with measurements $Y=(Y_1, \ldots, Y_n) \in R^n$ of certain actual corresponding properties (such as biometrics) $X=(X_1, \ldots, X_n)$ of the object. Since the measuring always introduces noise, the measurement vector $Y=(Y_1, \ldots, Y_n)$ consists of a true signal $X=(X_1, \ldots, X_n)$ and a corrupting noise $E=(E_1, \ldots, E_n)$. In the description, vectors will be used. It will be appreciated that any multi-dimensional array of numbers (measurements) can be easily converted to a vector (e.g. by concatenating the columns to one vector). As will be described in more detail below, in a preferred embodiment a control value is created on vector with fewer components. For the control value to be reasonable secure, it is desired that the subset includes a number of bits typically used in ciphers, such as 56 bits for DES or 128 bits for AES. Y should in this preferred embodiment include more components, for example twice as many. The length of Y may depend on the noise level and the amount of information present in the measurements (e.g. more noise, implies a need for more measurements).

As will be described below, the signal processing of two preferred embodiment is based on statistical properties of the signal X and/or noise E. These statistical properties may be estimated in any suitable way, for example by taking the measurements a number of times during the enrollment and then estimate the statistical properties using a suitable statistical estimation well-known to persons skilled in the art.

Creating a Robust Set of Properties

From the measured property set Y a property set I is created that meets a predetermined robustness criterion. Preferably, the predetermined robustness criterion is based on a signal to noise ratio of the measured properties. The property set Y is used to create two disjunct property sets $I_1$ and $I_2$ where a signal to noise ratio of properties of $I_1$ are estimated to be higher than a signal to noise ratio of properties of $I_2$. $I_1$ is then used as the property set I. In the following, three alternative embodiments will be described for creating the robust set of properties. The embodiments according to the invention provide robustness to measurement errors without using error-correcting codes.

First Embodiment

For the robust properties of set $I_1$ are selected those properties of Y with sufficiently large absolute values. Sufficiently large means that the contribution of $X_i$ to $Y_i$ is expected to be larger than the contribution of $E_i$, so a signal to noise (S/N) ratio of at least 1. By performing several measurements during the enrollment a good statistical estimation of the noise values $E_i$ can be obtained. Preferably, only properties of $Y_i$ that clearly exceed this estimate (e.g. S/N >3) are used as being robust, i.e assigned to set $I_1$. If the noise level of the measurement procedure is known it is not required to perform several measurements to obtain such an estimate.

Second and Third Embodiment

In these two embodiments, the property set I is created by performing a transformation $\Gamma$ on the property set Y to create the two disjunct property sets $I_1$ and $I_2$ where a signal to noise ratio of properties of $I_1$ are estimated to be higher than a signal to noise ratio of properties of $I_2$. The transformation $\Gamma$ depends on a statistical property of the measurement procedure. Preferably, the statistical property includes a covariance matrix derived from estimated properties X of the object and a corresponding statistical distribution F. Advantageously, the transformation $\Gamma$ is a linear transformation that converts a vector representing the property set Y to a vector with components $\alpha_i$ representing the set I, where each vector component $\alpha_i$ is independent of the other vector components $\alpha_j$ ($j \neq i$) and wherein the vector components are sorted according to an estimated signal to noise ratio. The threshold for assigning properties to the set $I_1$ (or $I_2$) is preferably derived from a noise level in the measured property set Y. The transformation Γ will be described for two embodiments (second and third embodiment) based on above principles. The first embodiment uses Principal component analysis; the second the other one on Fisher's transformation.

Second Embodiment—Principal Component Analysis

Suppose the n-dimensional vector $X=(X_1, \ldots, X_n)$ has a distribution F. Let $\Sigma$ be the corresponding covariance matrix $\Sigma=(\sigma_{ij})_{i,j=1}^n$, where $\sigma_{ij}=E(X_iX_j)-E(X_i)E(X_j)$ (in this formula E is the expectation).
Γ is the orthonormal matrix, consisting of the eigenvectors of $\Sigma$, i.e.,
$\Gamma^*\Sigma\Gamma=\Lambda=\text{diag}(\lambda_1, \ldots, \lambda_n)$, where without loss of generality it can be assumed that $\lambda_1 \geq \ldots \geq \lambda_n \geq 0$.
The i-th column of $\Gamma, \gamma_i$ is the eigenvector of $\Sigma$ with the corresponding eigenvalue $\lambda_i$. Let $m=E(X)$ be the mean of X, then every X can be represented as $X=m+\Gamma\alpha$ where $\alpha=(\alpha_1, \ldots, \alpha_n)$ is the vector with $\alpha_i=\langle X-m,\gamma_i\rangle$. $\alpha_i$ is called the i-th principal component of X. Therefore, for a random vector X a new random vector $\alpha$ is constructed. The distribution of $\alpha$ can be given for the case that X has a Gaussian distribution, i.e. $X \sim N(m,\Sigma)$. Then, the following holds $$E(\alpha_1) = 0; \quad (a)$$

$$E(\alpha_i^2) = \lambda_i; \quad (b)$$

$$\text{cov}(\alpha_i, \alpha_j) = E(\alpha_i\alpha_j) = 0 \text{ for } i \neq j; \quad (c)$$

$$Tr(\Sigma) = \sum_{i=1}^n \lambda_i, \det(\Sigma) = \prod_{i=1}^n \lambda_i. \quad (d)$$

Using a well known fact that uncorrelated Gaussian random variables are also independent, it can be concluded that $\alpha_1, \ldots, \alpha_n$ are independent, and $\alpha_i \sim N(0,\lambda_i)$.

Third Embodiment—Fisher's Discriminant Transformation

Assuming that X has a distribution F with mean m and covariance matrix $\Sigma_F$, and that E has distribution G with mean 0 and covariance matrix $\Sigma_G$, which is assumed to be positive definite. Let Γ be a matrix, consisting of the eigenvectors of $$\sum_G^{-1} \sum_F,$$

i.e., $$\sum_G^{-1} \sum_F \Gamma = \Lambda\Gamma = \text{diag}(\lambda_1, \ldots, \lambda_n)\Gamma.$$

The eigenvalues of $$\sum_G^{-1} \sum_F$$

equal the eigenvalues of $$\sum_G^{-1/2} \sum_F \sum_G^{-1/2}.$$

Hence, $\lambda_i \geq 0$ for all $i=1, \ldots, n$ and without loss of generality it can be assumed that $\lambda_1 \geq \ldots \geq \lambda_n \geq 0$. The i-th column of $\Gamma, \gamma_i$ is the eigenvector of $$\sum_G^{-1} \sum_F$$

with the corresponding eigenvalue $\lambda_i$. Using Γ define $\alpha=(\alpha_1, \ldots, \alpha_n)$ to be the vector with $\alpha_i=\langle Y-m,\gamma_i\rangle$. Therefore, for a random vector Y a new random vector $\alpha$ is constructed.

Supposing that both X and E have a Gaussian distribution, i.e. $X \sim N(m,\Sigma_F)$ and $E \sim N(0,\Sigma_G)$, where $\Sigma > 0$, and X and E are independent, then it can be proven that $\alpha \sim N(0,\Lambda+I)$ in the following way. That $\alpha$ is normally distributed with mean zero is obvious. To verify its covariance, first observe that $$\Gamma = \sum_G^{-1/2} \tilde{\Gamma},$$

where $\tilde{\Gamma}$ is an orthogonal matrix with the eigenvectors of $$\sum_G^{-1/2} \sum_F \sum_G^{-1/2}.$$

Thus, $$\begin{aligned}\text{VAR}(\alpha) &= \Gamma\left(\sum_G + \sum_F\right)\Gamma \\ &= \tilde{\Gamma}* \sum_G^{-1/2}\left(\sum_G + \sum_F\right)\sum_G^{-1/2}\tilde{\Gamma} \\ &= \tilde{\Gamma}*\tilde{\Gamma} + \tilde{\Gamma}*\sum_G^{-1/2}\tilde{\Gamma} \\ &= I + \Lambda\end{aligned}$$

where the last step uses the orthogonality of $\tilde{\Gamma}$ and the fact that the eigenvalues of $$\sum_G^{-1/2} \sum_F \sum_G^{-1/2}$$

are equal to the eigenvalues of $$\sum_{G}^{-1} \sum_{F}.$$

This proves the assertion about the covariance matrix of α.

Fisher's Discriminant Transformation is very similar in spirit to the Principal Component Transformation. However, in the case the noise is colored, i.e., the covariance matrix of the noise is not a multiple of the identity, the Fisher discriminant transformation can provide superior performance.

Determining Subset $I_1$ for the Second and Third Embodiment

In the remainder, it is assumed that the biometric data X have zero mean (which can always be achieved by subtracting m). After applying one of the transformations described above, a random vector α=ΓY is obtained. Components of α are centered and uncorrelated. Furthermore, under the normality assumptions of the previous section, a has a normal distribution, with a diagonal covariance matrix. It means that components $\alpha_i$, i=1, . . . , n are independent. $\lambda_i$ will be used to indicate the variance of $\alpha_i$.

It is recalled that a threshold is derived from a noise level in the measured property set and that the subset $I_1$ is created by assigning created properties $\alpha_i$ with an absolute value larger than the threshold to set $I_1$. δ is a small positive number, chosen appropriately depending on the noise level. The subset $I_1$ is now formed by the significant components: $I_1 = I_\delta(\alpha) = \{i=1, \ldots, n: |\alpha_i| > \delta\}$. One of the most important parameters to choose with respect to robustness to noise is the parameter δ. In each particular case δ should be chosen based on the properties of noise. In the case that the noise has a Normal distribution $N(0, \sigma_N^2 Id)$, where Id is the identity matrix, δ has to be chosen depending on $\sigma_N$. For instance, for the Principal Component Transformation, $\delta = 3\sigma_N$ or $\delta = 5\sigma_N$ will be sufficient to insure correct identification of one bit with probability 99.87% and 99.99997% respectively.

In the following it will be shown that with a large probability the transformation will give a sufficient number of significant components. For each i denote by $$p_i = P(|\alpha_i| > \delta),$$

$$q_i = 1 - p_i = P(|\alpha_i| \le \delta) = \frac{1}{\sqrt{2\pi\lambda_i}} \int_{-\delta}^{\delta} e^{\frac{t^2}{2\lambda_i}} dt.$$

Note that the following estimate of $q_1$ is trivial:

$$q_i \le \sqrt{\frac{2}{\pi\lambda_i}} \delta.$$

Consider the random variables $$z_i = \begin{cases} 0, & |a_i| \le \delta, \\ 1, & |a_i| > \delta \end{cases}$$

Note that $z_1$, i=1, . . . , n, are independent Bernoulli random variables, with $$P(z_1=1)=p_1, P(z_i=0)=1-p_1=q_i$$

In order for the authentication scheme to be versatile, one has to ensure a large number of significant components, or in other words, the $$\sum_{i=1}^{n} z_i$$

must be large with a large probability. Note that its expected value is given by $$E\left(\sum_{i=1}^{n} z_i\right) = \sum_{i=1}^{n} p_i = n - \sum_{i=1}^{n} q_i \qquad (0.1)$$

It is natural to assume that there is a substantial number of components with variance larger than $c\delta^2$, C>1. Suppose that the fraction of such components is at least ρ. Note that if the number of components with variance substantially large than $\delta^2$ is small, then the whole problem of authentication of physical objects with such properties becomes infeasible. There should be a sufficient amount of "energy" to distinguish various measurements. If there is not enough energy in the signal, the noise will dominate. This will make robust authentication impossible.

Continuing the estimate (1.1), one obtains $$E\left(\sum_{i=1}^{n} z_i\right) \ge n - \sum_{i=1}^{\rho n} q_i - \sum_{i=[\rho n]+1}^{n} q_i \ge [\rho n]\left(1 - \sqrt{\frac{2}{\pi c}}\right).$$

Hence it can be concluded that if there is a substantial fraction of components with large variance, then the expected value of the sum we are interested in, will be at least a large fraction of the number of such components. In other words, not many components are lost. We estimate the probability of the event that the sum $\Sigma_i z_i$ is small, i.e. that it is substantially smaller than the expected value. In this case, one expects that such event is improbable, and more precisely, that its probability becomes exponentially small. Let k be an integer smaller than $$E\left(\sum_{i=1}^{n} z_i\right)$$

and consider the probability $$P\left(\sum_{i=1}^{n} z_i \le k\right).$$

A classical Bernstein exponential inequality can be applied to derive an upper bound. Let $Y_1, \ldots, Y_n$ be independent random variables, such that $|Y_i| \le M$, $E(Y_i)=0$ then for every t>0 it can be proven that $$P\left(\left|\sum_{i=1}^{n} Y_i > t\right|\right) \leq 2\exp\left(-\frac{t^2}{2b_n^2 + \frac{Mt}{3}}\right), \text{ where } b_n^2 = \sum_{i=1}^{n} E(Y_i)^2.$$

Let $Y_1 = z_1 - E(z_i)$, $i=1, \ldots, n$. Then $|Y_i| \leq \max(1-p_i, p_i) \leq 1$, and $E(Y_i^2) = E(z_i - E(z_i))^2 = \text{var}(z_i) = p_i(1-p_i) = p_i q_i$.

$$P\left(\sum_{i=1}^{n} z_i \leq k\right) = P\left(\sum_{i=1}^{n} z_i - E\left(\sum_{i=1}^{n} z_i\right) \leq k - E\left(\sum_{i=1}^{n} z_i\right)\right)$$
$$= P\left(\left|\sum_{i=1}^{n} Y_i\right| \geq \left|k - E\sum_{i=1}^{n} z_i\right|\right).$$

Let $$E\left(\sum_{i=1}^{n} z_i\right) = \sum_{i=1}^{n} p_i = \kappa_1 n,$$

and $k = \kappa_2 n$, with $\kappa_2 < \kappa_1$. Then:

$$P\left(\sum_{i=1}^{n} z_i \leq k\right) \leq 2\exp\left(-\frac{(\kappa_1 - \kappa_2)^2 n^2}{2\sum_i p_i q_i + 2(\kappa_1 - \kappa_2)n/3}\right)$$
$$= 2\exp\left(-\frac{3(\kappa_1 - \kappa_2)^2}{6\tau + 2(\kappa_1 - \kappa_2)}n\right),$$

where $$\tau = \sum_{i=1}^{n} p_i q_i / n.$$

Example:

$$\kappa_1 = 0.4n,$$
$$\kappa_2 = 0.2n : P\left(\sum_{i=1}^{n} z_i \leq 0.2n\right)$$
$$= \exp\left(-\frac{3*0.04}{6*0.25 + 2*0.2}n\right)$$
$$\approx \exp(-0.063n).$$

Example: $\kappa_1 = 0.4n$, $\kappa_2 = 0.05n$:

$$P\left(\sum_{i=1}^{n} z_i \leq 0.2n\right) = \exp\left(-\frac{3*0.1225}{6*0.25 + 2*0.35}n\right) \approx \exp(-0.17n).$$

Reduce the Information

Starting from a set $I_1$ of robust features, represented by vector $\alpha$, the amount of information is reduced by performing a contracting transformation. In principle any suitable contracting transformation may be used. Least revealing is the use of only one-bit representations. This can, advantageously, be achieved by using a contracting transformation that transforms a property (i.e. component) of $\alpha$ to a binary number representative of a sign of the component. A suitable transformation is the Heaviside function:

$$H(t) = \begin{cases} 0, & t < 0, \\ 1, & t \geq 0. \end{cases}$$

Additionally or alternatively, the information can be reduced by only selecting a subset of the property set $I_1$. The selection that is made during the enrollment can be described by helper data W. This helper data is then stored as part of the authentication data and used during authentication to achieve the selection of the same subset at that moment. Preferably, for different applications different, unique helper data W is created. In this way each application uses its own subset (that may of course overlap).

Thus in a preferred embodiment, using the Heaviside function and the subset selection, the goal is to create a certain m-bit binary secret $C = (c_1, \ldots, c_m) \in \{0,1\}$ based on $\alpha$, i.e. property set $I_1$. The secret $C = (c_1, \ldots, c_m)$ can said to be feasible for $\alpha$ if there exist distinct indexes $i_1, \ldots, i_m$ such that $i_j \in I_1 = I_\delta(\alpha)$, for every $j=1, \ldots, m$, and $$c_j = H\left(\alpha_{i_j}\right) = \begin{cases} 1, & a_{i_j} \geq 0 \\ 0, & a_{i_j} < 0 \end{cases} \text{ for every } j = 1, \ldots, m.$$

Denote by $C_\delta(\alpha) \subset \{0,1\}^m$ the set of all feasible secrets for $\alpha$:

$C_\delta(\alpha) = \{C \in \{0,1\}^m : C \text{ is feasible for } \alpha\}$.

It is desired that $C_\delta(\alpha)$ is as large as possible. Under normality assumptions, $\alpha_i$ has a symmetric distribution. Hence if $s_i = H(\alpha_i)$, then $$P(s_i = 1 \mid |\alpha_i| > \delta) = P(s_i = 0 \mid |\alpha_i| > \delta) = \frac{1}{2}$$

In the previous section it has been shown that the expected number of significant components is equal to a certain fraction of n, say $\gamma n$. Moreover, the probability of a large deviation from the expected number is exponentially small. Since $s_i$ for each i such that $\alpha_i > \delta$ is a symmetrically distributed Bernoulli random variable, it is expected that approximately one-half of $s_i$'s is equal to 1, and approximately one-half of $s_i$'s is equal to 0. Using similar exponential inequalities, it can be shown that any substantial deviations from the expected value of one-half, is exponentially un-probable. Hence, m (the length of the secret) can be chosen to be a certain fraction of the expected number of significant components, i.e. $m = \gamma_1 n$, say $\gamma_1 = \gamma/10$. It can be shown that, with a large probability, a large portion of all $2^m$ secrets is feasible for $\alpha$. Hence, for certain physical measurements of an object, with a large probability it can be guaranteed that a secret can be chosen from an extremely large set. Therefore, with a large probability the authentication protocol according to the invention will be sufficiently versatile. On the other hand, in the un-probable event that for a given biometric information there are only few feasible secrets, it is possible to generate a secret for this particular biometric information, using another linear transformation, e.g., using a random orthonormal W.

So, it is possible to select a subset $\alpha_{i_j}$, giving the secret C, with $C_j = H(\alpha_{i_j})$. The helper data $W = W(X)$ can now be created by taking rows of Γ, with indexes $i_j$, j=1, ..., k, i.e. W is a k×n matrix. This helper data is stored as part of the authentication data.

Determining Subset $I_1$ for the First Embodiment

In the first described embodiment, W can be chosen to a random matrix. Suppose that the measurements X are n-dimensional real vectors. During the enrollment phase, choose a random and orthonormal matrix W. Let =WY, now select components of with sufficiently large absolute values. In principle, one should expect a large number of such coordinates. Using some (but not all!) of these coordinates, generate the secret C=($c_1$, ..., $c_k$), where $c_k$=H($\alpha_{i_k}$).

In other words, C=H($\tilde{W}$Y), where $\tilde{W}$ is a k×n matrix, obtained from W by selecting rows $i_1, ... i_k$. If W does not lead to a sufficient number of large components, another random matrix may be generated.

Summary of the Preferred Embodiments

Figures 2A, 2B:
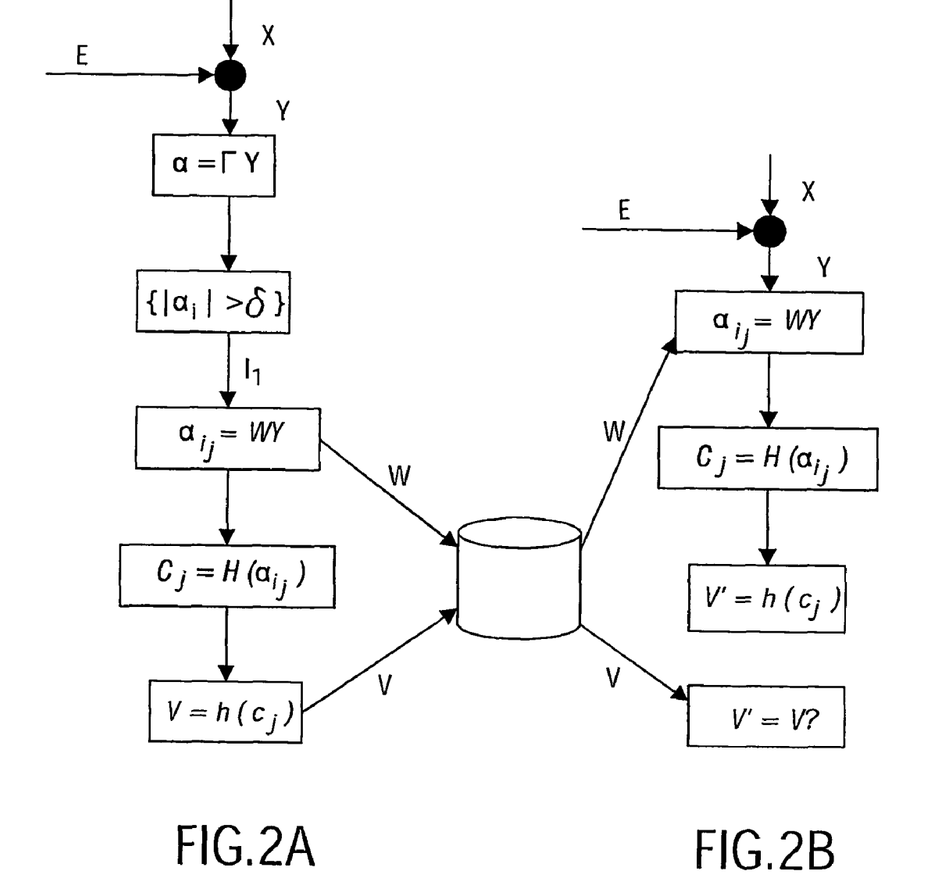
FIG. 2 shows the major processing steps in a preferred embodiment.

Enrollment, as illustrated in FIG. 2A
(1) Get measurements Y=($Y_1$, ..., $Y_n$)∈ R" of certain actual corresponding properties (such as biometrics) X=($X_1$, ..., $X_n$) of the object;
(2) Create robust properties from the property set Y, giving a set of robust properties $I_1$
  Perform transformation =Y, where Γ sorts the vector components according to an estimated signal to noise ratio;
  Select set I: $I_1$=I ( )={$|i_i|$>}, where δ is derived from a noise level in the measurements;
(3) Reduce the information:
  Select subset of $I_1$; selection defines selection function W(X) that is a subset of the transformation, thus the subset of selected robust properties is formed by: $\alpha_{i_j}$=WY;
  Generate secret by performing contraction on the subset: e.g. $c_j$=H($\alpha_{i_j}$) (where H is the Heaviside function) giving a binary code word C of length k n;
(4) Generate control value V, e.g. by using a collision resistant one-way hash function h V=h(C);
(5) Store: W, V.

In one particular embodiment, W is a k×n matrix, and C=H (g (Y, W))=H(W·(Y−m)), where H is the Heaviside function, m is a vector (e.g. mean) known to the system. The mean is average of each group of measurements being taken, e.g. if a fingerprint is measured several times, the mean is the average fingerprint (i.e. averaged over all fingerprints).

Hence, the total signal processing function G is given by G=H∘g. To ensure the security of the authentication procedure, it is preferred to choose W so that the coordinates of C=G(Y,W) are independent, or at least, uncorrelated, random variables. To ensure privacy, C is a binary vector (in the preferred embodiment created using the Heaviside function), hence knowing the C itself will not give a good estimate of the biometric template. Moreover, by using the subset selection controlled by W, the dimension of C can be made substantially smaller than the dimension of Y, effectively, a large part of the information about Y is not recorded. In the case, g(W, Y)=WY there are several attractive choices of the matrix W. For the first embodiment, W can be chosen as a random orthonormal transformation. Above a detailed description has been given for two preferred embodiments where W is a restriction of the Principle Component Transformation (PCT) to a specified k-dimensional subspace and W is a restriction of the Fischer transformation to a specified k-dimensional subspace, respectively.

Authentication as Illustrated in FIG. 2B
(1) Get W,V
(2) Get measurements Y=($Y_1$, ..., $Y_n$) ∈ R" of certain actual corresponding properties (such as biometrics) X=($X_1$, ..., $X_n$) of the object
(3) Reduce the information:
  Determine subset $I_1$ of robust properties: $\alpha_{i_j}$=WY
  Calculate secret by performing contraction: e.g. $c_j$=H ($\alpha_{i_j}$) (where H is the Heaviside function) giving a binary code word C of length k≦n.
(4) Calculate control value V', e.g. by using a collision resistant one-way hash function h V'=h(C)
(5) If there is a match against the retrieved control value V, the object is authenticated.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of generating authentication data for authenticating a physical object, the method comprising acts of:
  measuring the object to generate a property set of the object using a measurement procedure;
  defining criteria;
  creating a robust property set of the object from the measured property set that meet a predetermined robustness criterion;
  creating a reduced property set from the robust property set, the robust property set includes less information on the actual properties of the object than the measured property set, wherein the criteria guides the creating acts;
  generating a control value in dependence on properties of the reduced property set; and
  storing the authentication data including the control value and the criteria that guides the creating acts together on a storage device,
  wherein the criteria that is stored as a portion of the authentication data is not a member of property sets utilized for generating the stored control value and the criteria that is stored as a portion of the authentication data is used for generating an authentication control value that is compared to the stored control value for authenticating the object.

2. The method as claimed in claim 1, wherein the act of creating the reduced property set includes performing a contracting transformation that transforms given ranges of input properties to corresponding output values guided by the criteria.

3. The method as claimed in claim 2, wherein the contracting transformation transforms a property to a binary number representative of whether the property has a positive or negative value.

4. The method as claimed in claim 1, wherein the act of creating the reduced property set includes an act of selecting only a subset of the robust property set guided by the criteria.

5. The method as claimed in claim 4, the act of defining the criteria comprising an act of defining the criteria based on properties of the property set.

6. The method as claimed in claim 5, the act of defining criteria comprises acts of defining criteria based on respective authentication applications, wherein different respective authentication applications have different defined unique criteria.

7. The method as described in claim 1, wherein the act of creating the robust property set includes an act of performing a transformation on the property set to create disjunct first and second robust property sets, where a signal to noise ratio of properties of the first robust property set are estimated to be higher than a signal to noise ratio of properties of the second robust property set, and wherein the first robust property set is used as the robust property set.

8. The method as claimed in claim 7, wherein the transformation is a linear transformation that converts a vector representing the property set to a vector with components representing the robust property set, where each vector component is independent of the other vector components and wherein the vector components are sorted according to an estimated signal to noise ratio.

9. The method as claimed in claim 7, including the act of creating the transformation in dependence on a statistical property of the measurement procedure.

10. The method as claimed in claim 9, wherein the statistical property includes a covariance matrix derived from estimated properties of the object and a corresponding statistical distribution determined during the measuring of the object.

11. The method as claimed in claim 7, including an act of deriving a threshold from a noise level in the generated property set and assigning created properties with an absolute value larger than the threshold to the first robust property set.

12. The method as claimed in claim 1, wherein the act of generating the control value includes acts of:
converting each property of the reduced property set into a binary digit, and
performing a cryptographic function on a combination of the binary digits.

13. The method as claimed in claim 12, wherein the cryptographic function is a one-way function.

14. The method as claimed in claim 1, wherein the act of creating the robust property set of the object comprises an act of adapting the criteria until the robust property set includes a predetermined number of properties, wherein the act of storing the authentication data comprises an act of storing the adapted criteria that guides the creating acts.

15. The method as claimed in claim 1, wherein the physical object includes the persistent memory device and the act of storing the authentication data comprises an act of storing the authentication data in the physical object.

16. A computer program stored on a computer readable persistent memory device and operative to execute on a general purpose processor for generating authentication data for authenticating a physical object, the computer program being operative to cause a processor to:
measure the object to generate a property set of the object using a measurement procedure;
create a robust property set of the object from the measured property set that meet a predetermined robustness criterion;
define criteria;
create a reduced property set from the robust property set, the robust property set includes less information on the actual properties of the object than the property set, wherein the criteria guides the creating acts;
generate a control value in dependence on properties of the reduced property set; and
store the authentication data including the control value and the criteria together on a storage device,
wherein the criteria that is stored as a portion of the authentication data that guides the creating acts is not a member of property sets utilized for generating the stored control value and the criteria that is stored as a portion of the authentication data is used for generating an authentication control value that is compared to the stored control value for authenticating the object.

17. A method of authenticating a physical object; the method comprising acts of:
measuring the object to generate a property set of the object using a measurement procedure;
creating a robust property set of the object from the measured property set that meet a predetermined robustness criterion;
creating a reduced property set from the robust property set, the robust property set includes less information on the actual properties of the object than the property set;
generating an authentication control value in dependence on properties of the reduced property set,
retrieving from a persistent storage device authentication data including a control value and criteria, the authentication data is generated for the physical object during an enrollment guided by the criteria, wherein the criteria that is retrieved as a portion of the authentication data guides the creating acts and is not a member of property sets utilized for generating the retrieved and authentication control values and the criteria that is retrieved as a portion of the authentication data is used for generating the retrieved control value and for generating the authentication control value; and
authenticating the physical object if there is a predetermined correspondence between the generated authentication control value and the retrieved control value.

18. A computer program stored on a computer readable persistent memory device for authenticating a physical object, the computer program being operative to cause a processor to:
measure the object to generate a property set of the object using a measurement procedure;
create a robust property set of the object from the measured property set that meet a predetermined robustness criterion;
create a reduced property set from the robust property set, the robust property set includes less information on the actual properties of the object than the property set;
generate an authentication control value in dependence on properties of the reduced property set,
retrieve from a storage device authentication data including a control value and criteria, the authentication data is generated for the physical object during an enrollment, wherein the criteria that is retrieved as a portion of the authentication data is not a member of property sets utilized for generating the retrieved and authentication control values and the criteria that is retrieved as a portion of the authentication data is used for generating the retrieved control value and for generating the authentication control value; and authenticate the physical object if there is a predetermined correspondence between the generated authentication control value and the retrieved control value.

19. A system for authenticating a physical object, the system comprising:
    a storage for storing authentication data;
    an enrollment device for
        measuring the object to generate a property set of the object using a measurement procedure,
        creating a robust property set from the measured property set that meet a predetermined robustness criterion,
        defining criteria,
        creating a reduced property set from the robust property set, the robust property set includes less information on the actual properties than the property set, wherein the criteria guides the creating the robust property set and the reduced property set A,
        generating an enrollment control value in dependence on properties of the reduced property set and the criteria, and
        storing the authentication data including the enrollment control value and the criteria together on the storage;
    an authentication device for measuring the object to generate an authentication property set of the object using a measurement procedure,
        retrieving the authentication data including the enrollment control value and the criteria together from the storage,
        creating an authentication robust property set from the measured property set that meets a predetermined robustness criterion,
        creating an authentication reduced property set from the authentication robust property set, the authentication robust property set includes less information on the actual properties of the object than the authentication property set, wherein criteria that is retrieved from the storage guides the creating the authentication robust property set and the authentication reduced property set;
        generating an authentication control value dependence on properties of the authentication reduced property set, wherein the criteria that is retrieved from the storage as a portion of the authentication data is not a member of the property sets utilized for generating the enrollment and authentication control values and is used for generating the retrieved enrollment control value and for generating the authentication control value,
        authenticating the physical object if there is a predetermined correspondence between the retrieved authentication control value and the enrollment control value, and
        issuing a signal indicating whether or not the physical object has been authenticated.

20. An authentication device for authenticating a physical object, the authentication device comprising:
    an input for receiving a property set of a physical object measured using a measurement procedure and authentication data including an enrollment control value and criteria together from a storage;
    a processor for
        creating a robust property set from the measured property set that meets a predetermined robustness criterion,
        creating a reduced property set from the robust property set, the robust property set includes less information on the actual properties of the object than the property set, wherein the criteria that is received as a portion of the authentication data guides the creating the robust property set and the reduced property set,
        generating an authentication control value in dependence on properties of the reduced property set, and
        authenticating the physical object if there is a predetermined correspondence between the generated authentication control value and the retrieved enrollment control value, wherein the criteria that is received as a portion of the authentication data is not a member of the property sets utilized for generating the authentication control value and the criteria that is received as a portion of the authentication data is used for generating the enrollment control value and the authentication control value; and
    an output for issuing a signal indicating whether or not the physical object has been authenticated.

* * * * *